UNITED STATES PATENT OFFICE.

THOMAS HAWKS, OF ROCHESTER, NEW YORK.

IMPROVED EXTRACT OF MALT, &c., FOR MAKING BEER, ALE, AND PORTER.

Specification forming part of Letters Patent No. 37,578, dated February 3, 1863.

*To all whom it may concern:*

Be it known that I, THOMAS HAWKS, of the city of Rochester, in the county of Monroe and State of New York, have invented a new and Improved Product or Composition of Ingredients for Making Beer, Ale, Porter, and other Malt Liquors, which, being condensed and reduced to a solid, or nearly solid, substance, is in such state capable of easy and safe preservation and of transportation to any distance, very slightly affected by change of temperature, and of being readily converted at pleasure into beer, ale, or porter, according to the quality and quantity of the ingredients used, of which the following is a specification.

To accomplish this result I take barley or other grain malt and proceed with it in the usual manner for making wort by crushing or grinding, mashing, and draining, then mixing hops with the wort, and boiling and draining in the ordinary manner to separate the liquid from the hops.

Instead of cooling the liquid or allowing it to cool, or, if cooled, before fermentation commences, I place it in a suitable vessel or vessels for the purpose, and by boiling, or any process of rapid evaporation, reduce it to the consistency of a thick sirup, and while in this condition, and before the process of boiling is completed, I add to the sirup a quantity of sirup of cane-sugar of as near as may be the same consistency as the wort-sirup and not exceeding one-quarter of the same in quantity, and after being thoroughly mixed the boiling process is continued until the substance is brought nearly to a solid state, when it is allowed to cool, and before it is entirely cooled I add gelatine previously dissolved in hot water without boiling and brought as nearly as possible to the same consistency as the sirup with which it is to be mixed in the proportion of one gallon of the dissolved gelatine to twenty gallons of the reduced sirup, and when thoroughly mixed with the other articles, after cooling, it is packed in tight vessels of any kind suitable for transportation, and in that condensed form may be safely kept for a great length of time or transported to any distance and in any climate without material injury to its qualities. When required for use dissolve this condensed substance in pure water, either cold, luke-warm, or hot, or at a temperature proper for fermentation, apply yeast, and subject the liquid to the usual process of fermentation, keeping it at the temperature and managing it in all respects as in the ordinary manufacture of malt liquors. The quantity of the condensed extract used in a given quantity of water should be in proportion to the strength of the ale, beer, or porter required.

The addition of the sirup of sugar is found to give an increased preservative quality and consequent durability to the preparation, and to add to the alcoholic properties of the beer with greater economy than could otherwise be done, without injury to the taste, if the proportion of sugar above pointed out is not exceeded.

It should be observed that cane-sugar here used must be understood as in contradistinction to grape-sugar, which alone produces alcohol immediately by fermentation, and which is the kind of sugar derived in the preparation of the wort itself. The cane-sugar has preservative qualities which grape-sugar has not. By the "sirup of cane-sugar" I mean all kinds thereof practically in use from whatever substances made.

The gelatine not only aids in clarifying, and thus improving the beer during the subsequent process of fermentation, but is found to aid essentially in shielding the concentrated composition from any fermentation while in that condition, thus aiding the sugar-sirup in preserving the portable compound in an unchangeable state. On the other hand, when the composition is subsequently diluted with the proper amount of water, raised to the proper temperature, and subjected to the action of yeast, the gelatine even promotes the vinous fermentation. The gelatine may, however, be dispensed with, since the cane-sugar will really be sufficient to preserve the composition under any ordinary circumstances, and the use of gelatine for clarifying may be secured by adding it, when making beer, ale, or porter, from the dry preparation.

Instead of mixing and boiling the hops with wort, as above described, they may be separately boiled in water to the same extent as when boiled in the wort, and, after straining off the hops, the liquid may be reduced by boiling and evaporation to a solid, or nearly solid, substance and the wort separately reduced and mixed with the sirup of sugar and gelatine, as above mentioned, and the substances thus produced may be united when required for use, and then mixed with water and proceeded with as before mentioned.

I do not claim the use of the sirup of cane-sugar for the mere purpose of increasing the saccharine element of the compound; nor do I claim the addition of gelatine merely for its clarifying property in the subsequent fermentation; but I am not aware that these substances have before been employed in preparing a dry or concentrated portable compound for making beer and other malt liquors in such a manner that while they ultimately serve the usual purposes in the process of fermentation they have the additional and special effect of assisting the unchangeable preservation of the concentrated portable composition. Therefore,

What I claim as my invention, and desire to secure by Letters Patent, is—

A concentrated portable preparation of wort mixed with and shielded by the sirup of cane-sugar, either with or without the addition of gelatine, for increasing its security against the influence of atmospheric changes, substantially as and for the purposes above specified

THOMAS HAWKS.

Witnesses:
 FRANC. A. MACOMBER.
 A. B. SPENCER.